United States Patent [19]
Rosenkoetter

[11] Patent Number: 5,293,733
[45] Date of Patent: Mar. 15, 1994

[54] DEFOLIATING TOBACCO HARVESTER

[75] Inventor: Robert G. Rosenkoetter, Tarboro, N.C.

[73] Assignee: Long Manufacturing N.C., Inc., Tarboro, N.C.

[21] Appl. No.: 1,576

[22] Filed: Jan. 6, 1993

[51] Int. Cl.⁵ .............................................. A01D 45/16
[52] U.S. Cl. ..................... 56/27.5; 56/16.6; 198/604
[58] Field of Search ............ 56/27.5, 16.6; 198/604, 198/620, 638, 642

[56] References Cited

U.S. PATENT DOCUMENTS

| | | | |
|---|---|---|---|
| 2,987,166 | 6/1961 | Gray | 198/604 X |
| 3,093,949 | 6/1963 | Splinter | 56/27.5 |
| 3,466,856 | 9/1969 | Rakestraw | 56/27.5 |
| 3,695,014 | 10/1972 | Alphin et al. | 56/27.5 |
| 3,902,304 | 9/1975 | Mitchell et al. | 56/27.5 |
| 3,946,542 | 3/1976 | Long | 56/1 |
| 3,992,860 | 11/1976 | Bobbitt, Jr. | 56/27.5 |
| 3,999,359 | 12/1976 | Jordan et al. | 56/27.5 |
| 4,023,331 | 5/1977 | Gregory et al. | 56/27.5 |
| 4,038,808 | 8/1977 | Patten et al. | 56/27.5 |
| 4,073,378 | 2/1978 | Jordan et al. | 56/27.5 X |
| 4,391,084 | 7/1983 | Wilson | 56/27.5 |
| 4,530,203 | 7/1985 | DeCloet | 56/27.5 |

*Primary Examiner*—David J. Bagnell
*Attorney, Agent, or Firm*—Dowell & Dowell

[57] ABSTRACT

A picker bar assembly for a defoliating tobacco harvester is configured to receive tobacco stalks and strip them on both its descending and ascending runs without damaging the stalks. An improved conveyor has a leaf deflector to prevent carryover and bunching of the leaves.

12 Claims, 5 Drawing Sheets

DEFOLIATING TOBACCO HARVESTER

BACKGROUND OF THE INVENTION

1. Field of the Invention

This invention relates to the harvesting of flue-cured tobacco by mechanical means.

2. History of the Related Art

Bright leaf flue-cured tobacco was developed during the 19th century. Harvesting by hand involved removing two to four leaves at numerous pickings over a period of several weeks and stringing the leaves on a stick for curing, all of which involved a great deal of manual labor. In more recent times vehicles for leaf picking workmen have been produced with conveyors for the leaves, and bulk harvesting and curing bins, have generally supplanted leaf stringing and stick curing in barns. Machines to mechanically strip the leaves have been made but accompanied by problems.

The U.S. Pat. Nos. 3,695,014 and 4,038,808, assigned to Clemson University, disclose a harvester having mechanical leaf strippers. Other mechanical leaf strippers are shown in the U.S. Pat. Nos. 3,093,949, to Splinter 3,466,856, to Rakestraw 3,999,359, to Jordan et al. 4,023,331, to Gregory et al. 4,391,084, to Wilson and 4,530,203 to De Cloet.

In the harvester of the two Clemson patents, the defoliator belt, itself, provides the openings for receiving the tobacco stalks. Thus, the belt elements which form the openings are in the plane of the belt and their angular disposition varies with its angularity. The horizontal dimension of the opening must be sufficient to slip over the end of the stalk with relative ease, but such opening may be too large for efficient stripping. Thus, in the later Clemson U.S. Pat. No. 4,038,808, the angularity is increased from the upper to the lower portion of the run, to reduce the effective horizontal dimension of the opening in order to improve the leaf stripping action. This also reduces the stalk height available for stripping at the reduced angle, thus rendering its stripping action less effective on the upper portion of the stalks. In addition, since the opening is effectively reduced to improve stripping, when the change of direction from downward to upward occurs the likelihood of breaking the stalk increases. An additional problem with the Clemson harvester is that the conveyor belt for removing the leaves is positioned directly beneath the defoliating belt on the upward slope and its proximity interferes with the removal of the leaves.

SUMMARY OF THE INVENTION

It is an object of the present invention to provide a defoliating tobacco harvester having a picker bar of improved configuration adapted to receive the stalk and also to remove the leaves therefrom.

It is a further object of the invention to provide a picker bar for a defoliating tobacco harvester in which the picker bar has angularly disposed portions thereby providing openings of adequate size to receive the tobacco stalk but which, due to the angle at which it is carried on a conveyor chain, efficiently removes the leaves both in a downward and an upward motion, at the same time providing an opening large enough so that the stalk is not damaged.

It is a further object of the invention to provide a defoliating tobacco harvester having an improved defoliating mechanism and in which the conveyor for removing the stripped leaves is spaced from the defoliating mechanism and has a leaf deflector, thereby facilitating leaf removal therefrom.

DESCRIPTION OF THE DRAWINGS

The foregoing and other objects of the invention will become apparent from the following description in conjunction with the accompanying drawings in which.

DESCRIPTION OF THE PREFERRED EMBODIMENT

Figure 1:
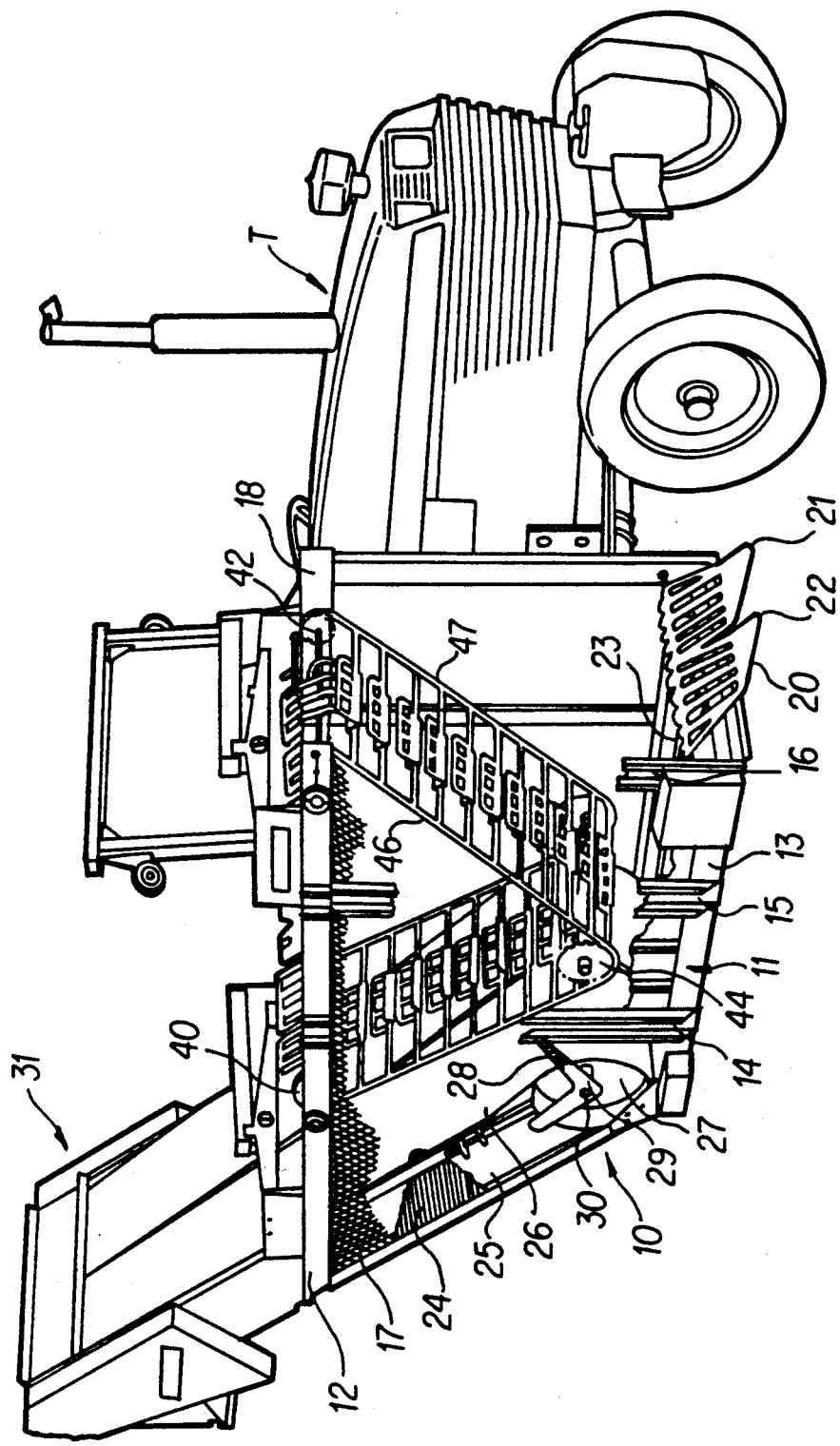
FIG. 1 is a perspective illustrating a harvester in accordance with the present invention, with a portion broken away for clarity, mounted on a tractor.
Figure 3:
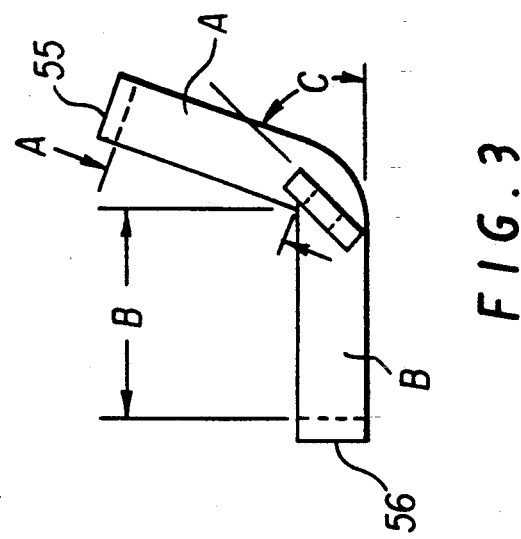
FIG. 3 is a side elevation of the picker bar of FIG. 2.
Figure 2:
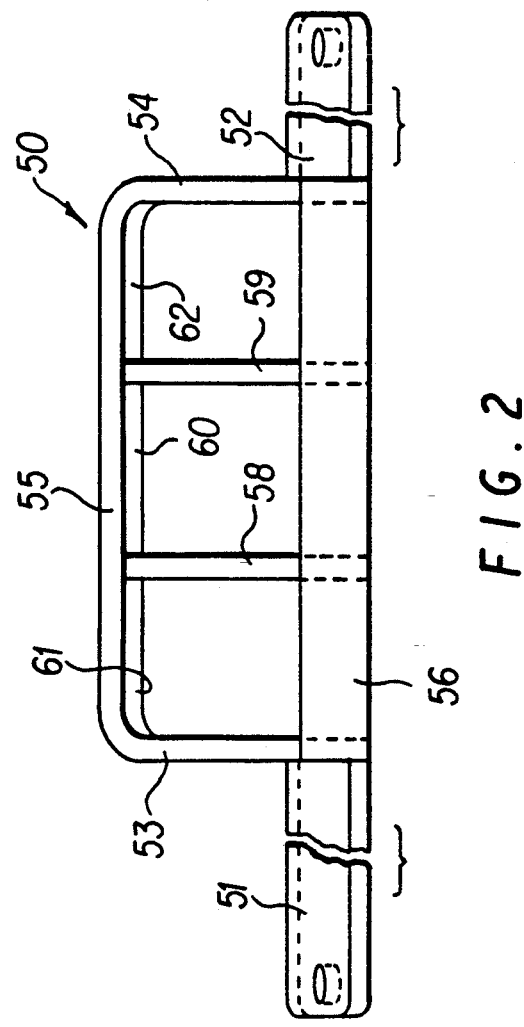
FIG. 2 is a top plan view to an enlarged scale of a picker bar in accordance with the present invention.
Figure 4:
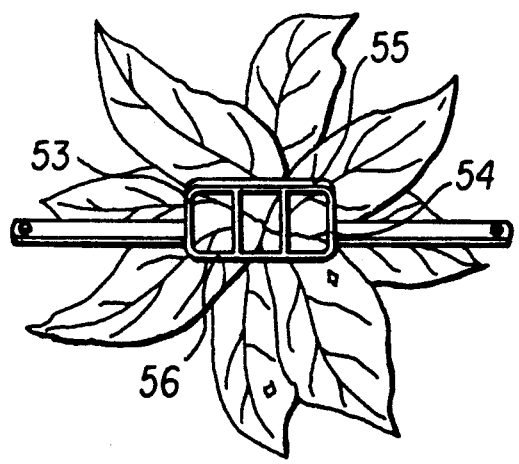
FIG. 4 is a view similar to FIG. 2 to a reduced scale, illustrating the manner in which a stalk is received in an opening in the picker bar.

With further reference to the drawings, a tractor T is disclosed having a side mounted harvester assembly 10. The harvester includes a frame 11 having upper and lower side rails 12, 13 connected by side bars 14, 15 and 16, at each side of the harvester and having a mesh 17 at each side. The sides of the frame are connected by a front cross-member 18 and others (not shown). The frame mounts a picker assembly and an endless conveyor assembly which feeds the leaves from a lower horizontal portion of the harvester over a rearwardly inclined portion.

The frame has a pair of spaced guide aprons 20, 21 having an opening 22 therebetween for receiving the tobacco stalks S as the tractor moves forwardly.

Figure 5:
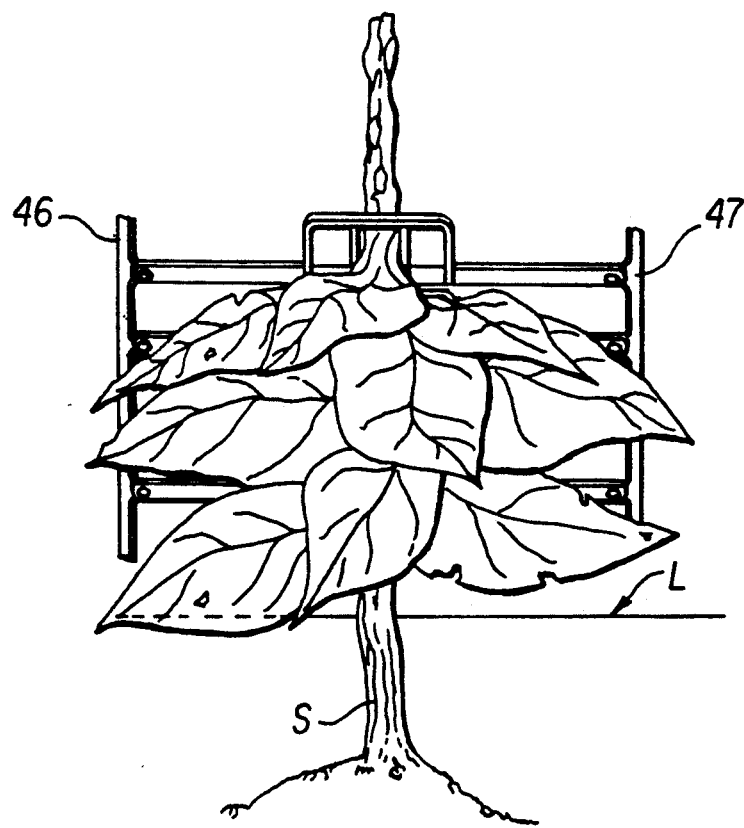
FIG. 5 is a front view of a conveyor chain carrying a series of picker bars in accordance with the present invention and illustrating the manner in which a stalk is received in an aperture of one of the picker bars.

For receiving and carrying the picked leaves upwardly to a bin, a conveyor system of a type generally known in the art includes a pair of spaced co-planar conveyor belts 23, running from front to rear of the lower side rails 13. These belts, in use, are at an appropriate level L (FIGS. 5 and 6) and move the leaves to the rear of the rails 13 for engagement by the upper run 24 of a pair of spaced co-planar conveyor belts. Belts 24 are just below the lower run 25 of a pair of spaced co-planar belts having a downwardly moving upper run 26 passing around a lower roller 27. The leaves are carried upwardly between the runs 24 and 25 to a conveyor section 31 substantially above the picker assembly in order to facilitate transfer of the leaves to a bin carried behind the conveyor system. The upper conveyor frame is pivotably mounted at its upper end 32 so that the upper conveyor may move away from the lower conveyor against the resistance of spring 28 on arm 29 mounted on the shaft 30 of the roller 27. The large size of the roller 27 facilitates the entry of leaves between it and the lower conveyor 24. The conveyors are conventionally driven from the tractor.

Figure 7:
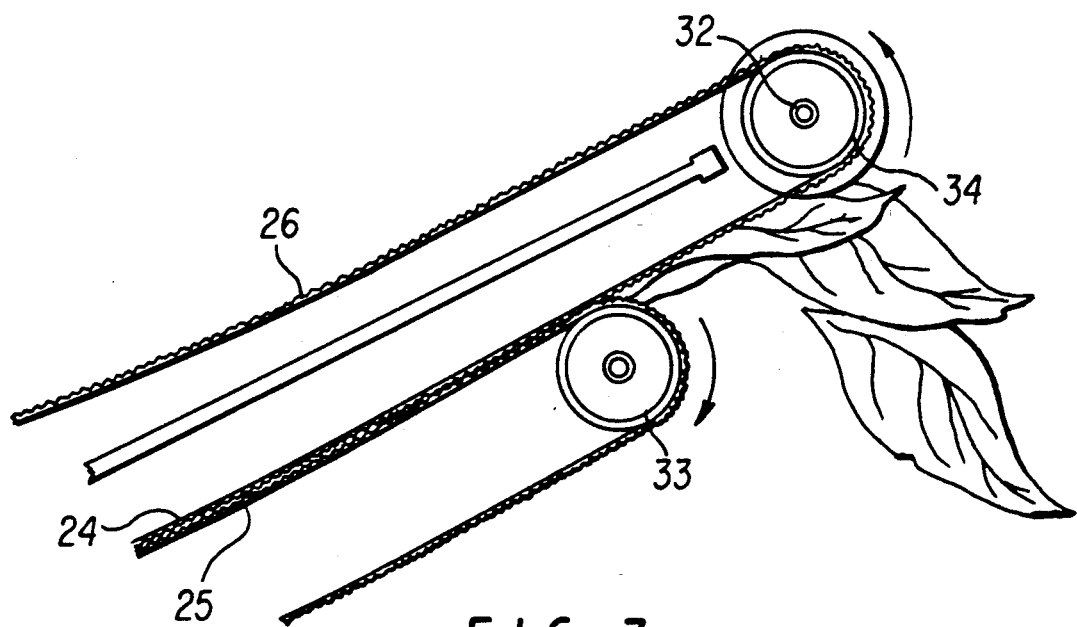
FIG. 7. is a fragmentary elevation, to an enlarged scale, from the opposite side of the view in FIG. 1, of the upwardly inclined conveyor belts, illustrating the action of the deflector roller in removing a leaf.
Figure 8:
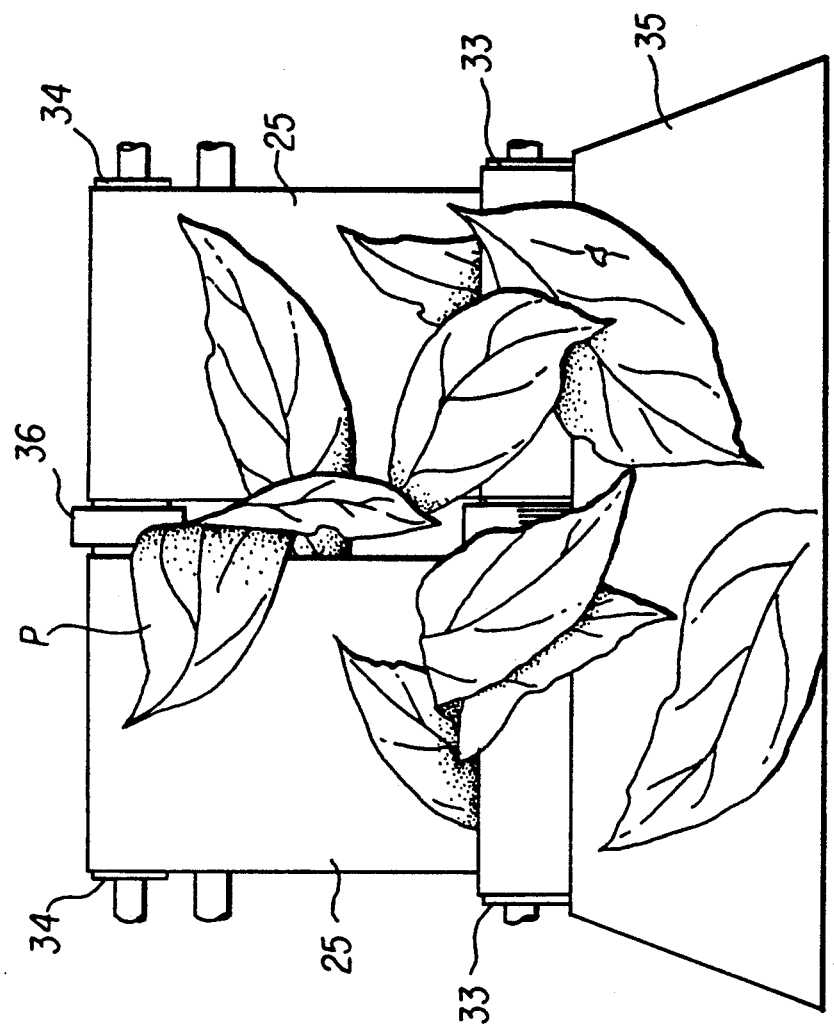
FIG. 8 is a rear view taken approximately perpendicularly to the belts of FIG. 7 illustrating the deflector leaf roller and the movement of leaves.

The foregoing general arrangement is improved, in the present invention, by a provision for deflecting leaves that tend to be carried over the top and downwardly on the run 26. If this occurs, a pile of tobacco at the bottom of the inclined belts may cause clogging of the conveyor assembly. Thus, in the present invention, see especially FIGS. 7 and 8, the upper roller 33 of the lower belt terminates ahead of the upper roller 34 of the upper belt. This provides a space above the lower conveyor from which the leaves may be discharged into a bin 35. In order to prevent leaves from being drawn up and over the upper roller 34 which carries the spaced belts, a deflector roller 36 is mounted between the belt carrying rollers 34. Roller 36 is larger than rollers 34 and acts as a barrier which will not permit leaves that are caught between the upper belts 25 and those that tend to adhere to the upper belts to pass over the top of the upper roller. Thus, in FIG. 8, leaf P is illustrated as deflected by the roller.

A defoliator assembly is mounted forwardly of and between the sides of the harvester and includes pairs of upper rear sprockets 40, forward sprockets 42, and a lower central sprocket 44, the three sprockets being arranged in a triangle. Spaced endless chains 46, 47 run continuously around the sprockets, providing a descending run, an ascending run, and a return horizontal run. One of the sprockets is conventionally driven from the tractor. The ascending run is spaced substantially from the conveyor belts 26, approximately twelve inches, in order that leaves which pass downwardly beneath that portion of the defoliator assembly may drop onto the belt and pass to the lower conveyor without bunching up beneath the picker bars carried by the chains.

A plurality of defoliator units are mounted in spaced relation between the chains.

Each defoliator unit includes a central picker bar 50 carried by side bars 51, 52 that are connected to the chains 46, 47.

Figure 6:
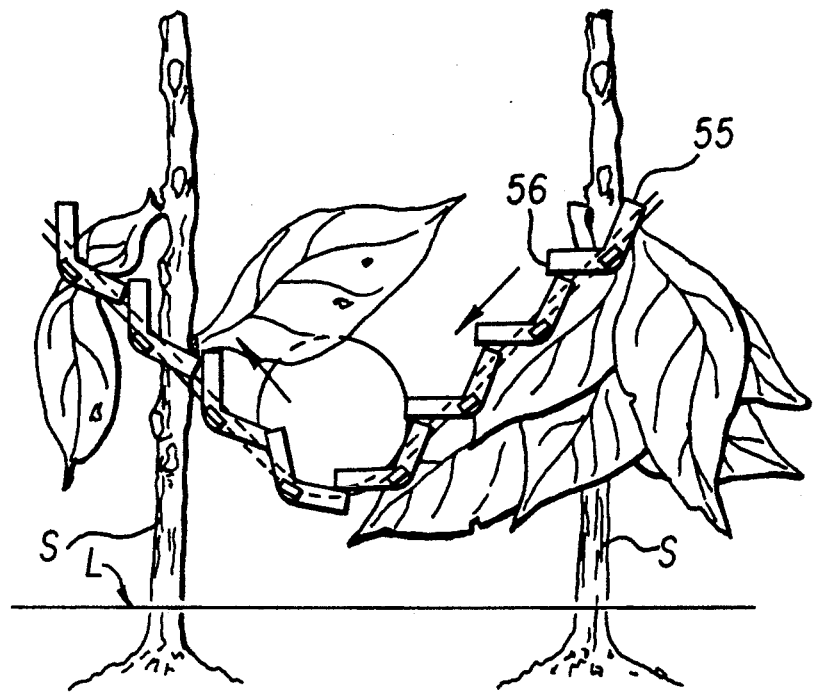
FIG. 6 is a side elevation illustrating the path of a conveyor chain in its descent and ascent on a stalk.

Each picker bar has parallel side members 53, 54 connected by front and rear members 55, 56. The side members have a forward portion A and a rearward portion B which are disposed at approximately 110° to 115° to each other. While A and B may be of equal length, approximately 2¼", it is preferred that B be slightly larger than A, say ¼" to ½", in order to reduce the likelihood of breaking the stalk. The side bars 51, 52 are connected with their planes approximately parallel to that of the chains 46, 47 and at an angle C of approximately 45° to the rearward side bar portion B. Resultantly, as the picker bar moves downwardly on the descending run of the conveyor chain, its rearward portion B is disposed approximately horizontally; however, as it ascends on the upper portion of the run, the rearward picker bar is disposed approximately vertically, as indicated in FIG. 6.

Each of the picker bars has a pair of spaced intermediate members 58, 59 connected at their ends to the front and rear members 55, 56. The intermediate members are of similar configuration to the side members 53, 54 and parallel thereto. The intermediate members are spaced to provide a central opening 60 and side openings 61, 62 for each picker bar. Ordinarily, the stalks will enter the central opening 60 for leaf removal. However, if the top of the stalk is not aligned with the central opening, it may enter one of the side openings, 61 or 62.

Due to the configuration of the picker bar assembly it will be apparent that the opening available to receive the stalk is considerably greater than its horizontal dimension. This facilitates the entry of the stalk into the opening and permits a smaller horizontal stripping dimension the entire height of the stalk, thereby improving the stripping action. Furthermore, when the disposition of the chain carrying the picker bars changes from the descending to the ascending mode, the change in angularity of the picker bar assembly does not result in so constricting the opening that damage to the stalk occurs.

In addition, due to the angularity of the portions of the picker bar, effective stripping action occurs both on the downward and the upward stroke. Most of the leaves are removed on the downward stroke and fall directly onto the conveyor belts 23 below. However, on the downward stroke some leaves are merely bent over and not removed and these are removed on the upward stroke and can fall through the spaces between the side bars carrying the picker bars onto to the conveyor belts 26 and 23 below, without requiring any additional means for removing the leaves therefrom. After being carried to the top rear of the conveyor by the belts 24 and 25 the leaves are discharged into container 35.

It is understood that in operation the forward motion of the tractor and the linear motion of the chains 46, 47 is synchronized so that the horizontal velocity of the picker bar apertures is substantially equal and opposite to that of the tractor so that as a stalk enters and passes along an aperture in a picker bar on the inclined portions of the chains that the stalk remains substantially upright as the aperture runs along the stalk.

I claim:

1. In a machine for removing leaves from vertically standing plant stalks, said machine having an endless defoliating means with a downwardly inclined front portion and an upwardly inclined rear portion, said defoliating means having a plurality of longitudinally spaced stalk receiving and leaf removing apertures, a mobile frame supporting said defoliating means, and means for moving said mobile frame and said defoliating means so that the horizontal velocity of said apertures on said inclined portions is substantially equal and opposite to that of said mobile frame so that as a stalk enters and passes along an aperture on the inclined front and rear portions the stalk remains substantially upright as the aperture moves along the stalk, the improvement comprising, said defoliating means having a plurality of picker bars defining said apertures, each of said picker bars having parallel side members connected by parallel front and rear members, the side members having forward and rearward portions providing, with the front and rear members, an aperture for receiving a stalk, said forward and rearward portions disposed at approximately 110° to each other.

2. A machine as defined in claim 1 in which the endless defoliating means includes conveyor chain means, and means mounting said picker bars on said conveyor chain means so that the picker bars' rearward portion is disposed substantially horizontally on said downwardly inclined front portion and substantially vertically on the upwardly inclined rear portion.

3. A machine as in claim 1, in which the picker bars have a pair of spaced parallel members intermediate said parallel side members and defining with said parallel side members central and outer apertures.

4. A machine as in claim 1, in which the forward and rearward portions are of substantially equal length.

5. A machine as in claim 1, in which the rearward portion is slightly longer than the forward portion.

6. A machine as in claim 1, in which the horizontal aperture dimension of the picker bars is substantially equal on the downwardly inclined front portion and the upwardly inclined rear portion.

7. A machine as in claim 1, in which a conveyor means has portions located beneath said front and rear portions to collect leaves falling from said picker bars.

8. A machine as in claim 7, in which the portion of said conveyor means located beneath said rear portion is spaced a substantial distance therebeneath.

9. A machine as in claim 7, in which said conveyor means includes a rearwardly and upwardly inclined section, said section having upper and lower endless conveyors having upper and lower ends and comprising spaced co-planar belts having upper and lower runs, the upper run of the lower conveyor cooperating with the lower run of the upper conveyor for moving leaves upwardly and rearwardly, the lower conveyor having its upper end terminating short of the upper end of the upper conveyor to provide a space for discharge of the leaves, and deflector means mounted between the spaced belts of the upper conveyor and at its upper end to deflect any leaves being carried upwardly beyond the upper end of the lower conveyor.

10. The machine of claim 9, in which the deflector means is a roller which extends radially beyond the upper end of the upper conveyor.

11. In a conveyor assembly for carrying leaves from a lower to an upper position, in which said conveyor assembly includes a rearwardly and upwardly inclined section, said section having upper and lower endless conveyors having upper and lower ends and comprising spaced co-planar belts having upper and lower runs, the upper run of the lower conveyor cooperating with the lower run of the upper conveyor for moving leaves upwardly and rearwardly, the lower conveyor having its upper end terminating short of the upper end of the upper conveyor to provide a space for discharge of the leaves, and deflector means mounted between the spaced belts of the upper conveyor and at its upper end to deflect any leaves being carried upwardly beyond the upper end of the lower conveyor.

12. The assembly of claim 11, in which the deflector means is a roller which extends radially beyond the upper end of the upper conveyor.

* * * * *